May 29, 1956

M. KURATA 2,747,752

METHOD AND APPARATUS FOR AUTOMATICALLY
SPOT LOADING PLATE GLASS ON A CONVEYOR

Filed Jan. 5, 1953

INVENTOR.

Motoharu Kurata

BY Richard Geier

ATTORNEYS

May 29, 1956

M. KURATA 2,747,752

METHOD AND APPARATUS FOR AUTOMATICALLY
SPOT LOADING PLATE GLASS ON A CONVEYOR

Filed Jan. 5, 1953

INVENTOR.

Motoharu Kurata

BY *Richard Geier*

ATTORNEYS

United States Patent Office 2,747,752
Patented May 29, 1956

2,747,752

METHOD AND APPARATUS FOR AUTOMATICALLY SPOT LOADING PLATE GLASS ON A CONVEYOR

Motoharu Kurata, Shibuya-ku, Tokyo, Japan, assignor to Asahi Garasu Kabushiki Kaisha, Tokyo, Japan, a corporation of Japan Application January 5, 1953, Serial No. 329,505

3 Claims. (Cl. 214—91)

The present invention relates to a method of and an apparatus for automatically loading glass sheet to be cut, at a definite position on a conveyor.

An object of the invention is to provide an improved method of loading glass sheet to be cut, on an automatic glass cutting apparatus at a definite position automatically and accurately.

Another object of the invention is to provide an improved apparatus of loading glass sheet to be cut on an automatic glass cutting apparatus at a definite position automatically and accurately.

A further object of the invention is to provide automatic loading of glass sheet to be cut, at a definite position on a conveyor which is a part of a cutting table of the sheet glass cutting apparatus.

Still another object of the invention is to enable glass sheets to be accurately loaded at a definite position on a conveyor and thereby to reduce cutting allowance to a minimum.

Still further objects, features and advantages of the invention will be apparent from the following descriptions.

The present invention contemplates loading the glass sheet to be cut at a definite position on the conveyor of an automatic glass cutting apparatus and forwarding it to a fixed stop pin on the conveyor by utilizing a thrusting action originated at a certain point of a semi-circular end portion of the conveyor.

Hitherto, both sides of a sheet of glass drawn continuously from an annealing leer or tower had to be cut off due to their inherent defects, whereas in the other two sides the occurrence of useless portions is avoided as much as possible by transversely cutting the glass sheet to an accurate desired size. In prior cutting apparatuses, however, as it was impossible to load the glass sheet at a definite relative position with respect to a cross cutting device, one was compelled to provide surplus cutting allowances and use long glass sheet in order to cut them to desired sizes. This excessive cutting allowance resulted in an uneconomical practice.

According to the present invention, such defects as heretofore described can be avoided and useless cutting allowances reduced to a minimum by transversely cutting the glass sheet to be cut to an accurate desired size after the glass has been loaded accurately at a definite position on the conveyor.

According to the present invention, there are provided wooden plates, one for each link of the conveyor chain of an automatic glass cutting apparatus, which retain glass sheets in a straight line by keeping them in a horizontal position preventing lateral rocking. The conveyor is divided into equal sections in which all operations, such as the loading of glass sheet to be cut, cutting of glass sheet, and trimming off of edge portions are accomplished. In the conveyor, a definite number of small holes containing stop pins or rule plugs are provided at definite positions on the wooden plates constituting the conveyor.

The present invention enables the transfer of the glass sheet to the conveyor by turning the tilting frame or tipple against which said glass to be cut has rested, and to move the glass sheet by the thrusting action of the tipple on to the conveyor at a higher speed than that of the conveyor itself, up to the predetermined position of the conveyor where stop pins are projected, thereby loading the glass sheet to be cut accurately at a definite position on the conveyor.

Further, in the present invention, in case the conveyor is made up of one or several strips of textile or leather belts or of a series of rollers and the like, small rollers having a circumferential speed somewhat higher than that of the conveyor's travel are provided between the tilting frame and conveyor or between consecutive conveyors; or one roller of the roller series is made to perform aforesaid action; and in a case of a container without stop pins a small endless belt capable of running in contact with the lower face of the conveyor at an equal speed as the conveyor and having protruding pins is provided; and in case the conveyor comprises a single belt, a small hole is provided, through which a stop pin is projected from a supporting body underneath; or in case several strips of belt are employed, small endless belts as described above are passed over parallel clearances between those belts and stop pins are secured to said small endless belts; in case the conveyor consists of rollers, protrusions only provided at definite positions are projected instantaneously through clearances between consecutive rollers to act as a stop pin and the glass sheet having been transferred on the conveyor is forwarded by specially provided small rolls or rollers to the predetermined positions, thus enabling loading of glass sheet at the predetermined positions.

In order to make the present invention more clearly understood, a preferred embodiment according to the present invention is described by way of example in reference to the accompanying drawings, in which.

Figure 5:
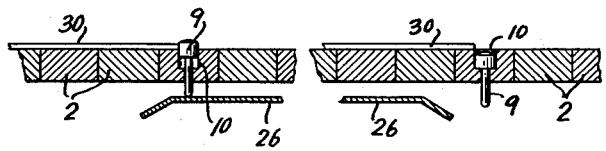
Fig. 5 is a partial sectional view of the relative action of the stop pins and loaded glass sheets.
Figure 6:
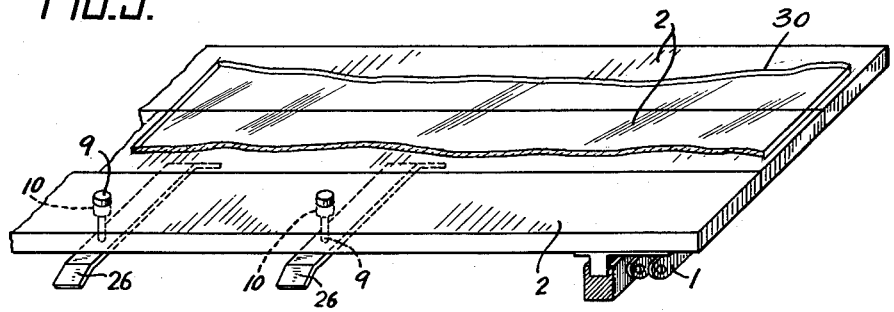
Fig. 6 is a partial sectional view through the line VI—VI of Fig. 2.
Figure 7:
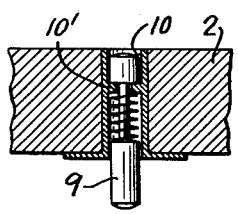
Fig. 7 is a sectional view showing stop pin contained in the small pin hole.

Referring to the drawings, the conveyor is constituted of a conveyor chain 1, each individual link of which is provided with a wooden plate 2 and is adapted to permit movement without lateral rocking. Two small pin holes 10 (Fig. 5) are provided at a suitable distance from each other at required positions on the desired wooden plate 2; inside those holes stop pins equipped with coil springs (Fig. 7) are contained and the head of the stop pin is urged normally by the coil spring against the supporting shoulder 10' in the pin hole 9.

This conveyor motivated by being passed over the sprocket wheels mounted on the main shaft journalled in suitable bearings on the frame works on both ends of the conveyor. On the main shaft 4 (Fig. 3) journalled in the bearings on the frame work 3, a chain wheel 6 is carried besides the sprocket wheel 5. A chain wheel 8 is mounted on driven shaft 7, which is journalled in suitable bearings on the same frame work 3. The revolution of main shaft 4 is transmitted to the shaft 7 by means of a belt chain passed around the above two chain wheels 6 and 8.

A side bar 11 of L-shaped cross section composing a tilting frame or tipple for the loading device against which the glass sheet 30 is to be rested, is firmly connected with the connecting bar 12 and bottom bar 12' at the lower part thereof, while at the upper part the side bar is loosely connected with the glass receiving roll bar 13 so as to constitute a rectangular frame. Two L-shaped glass supporting pieces 14 are secured to the connecting bar 12 and bottom bar 12' by means of racks 15 provided on the back wall of said supporting piece and pinions 16 the height of the glass to be rested against the said frame is adapted to be accommodated, journals 18 of a glass receiving roll bar 13 extended through elongated slots 17 on the upper parts of both side bars 11 and are held loosely and movably on parts of both side bars. Further, to the arm pieces 19 at right angle to the axial direction of the said roll bar 13 at the upper part of said bars 11 is pivoted a lever 20 at 20', one arm of which lever is provided with a roller 21 and other arm of which lever has a bifurcated piece 22. The both journals 18 of the roll bar 13 are supported on said bifurcated piece 22 respectively and are adapted to move freely along the elongated slot 17.

When the tilting frame of the loading device is turned and the roll bar 13 is about to come in contact with the conveyor, the roller 21 engages with the receiving rest 23 positioned lower than the level of the conveyor, swinging the lever 20.

Near the center of the side bar 11, a fin-shaped plate 25 is provided at right angles to the side bar, the front end portion of said fin-shaped plate is pivoted to the main shaft 4 and to the upper side portion thereof is pivoted the one end of the connecting rod 24 the other end of which rod is pivoted to the crank 29 of aforesaid shaft 7, the frame of the loading device being turned around the shaft 4 by the movement of said connecting bar 24, as the main shaft 4 turns.

The stop pin or plug 9 acting as a ruler for the loading of glass on the conveyor is projected upwards out of the small pin hole 10, after being raised by a suitable mechanism, for instance, along the inclined surface of the stop pin, lifting member 26 (Fig. 5) provided below the conveyor. The stop pin 9 remains projected for a desired distance of its travel against the pressure of the spring and serves as a ruler, and with a further advancing of the conveyor, the bottom end of said stop pin 9 slides down along the other inclined surface and thus enters into the pin hole 10.

Furthermore, a pair of guide frames 27 are bridged across above the conveyor at right angle to the line of the travel of the conveyor and on one side wall of a slide bed 28 mounted slidably on said guide frame are provided with cross cutting tools. Thus, when the glass plate loaded on a definite position of the conveyor reaches the desired position of the cross cutting device the glass is cut or scored with the cross cutting tool or tools, after which the glass plate thus scored transversely is carried forward to the predetermined section B for the longitudinal scoring operation, where the longitudinal cutting is made on the surface of the said glass. Then, the glass which has been previously scored transversely and longitudinally is trimmed off at the edge portions in the section D.

Figure 1:
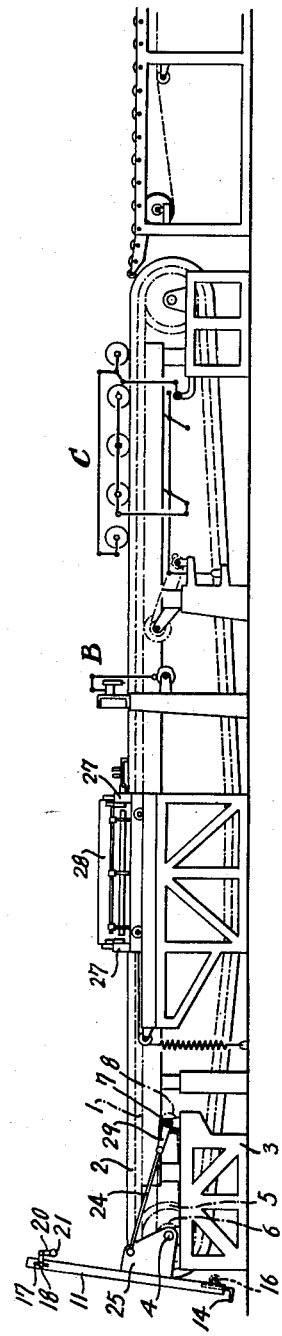
Fig. 1 is a side view of an automatic glass cutting apparatus in which an automatic glass loading device of this invention is applied.
Figure 2:
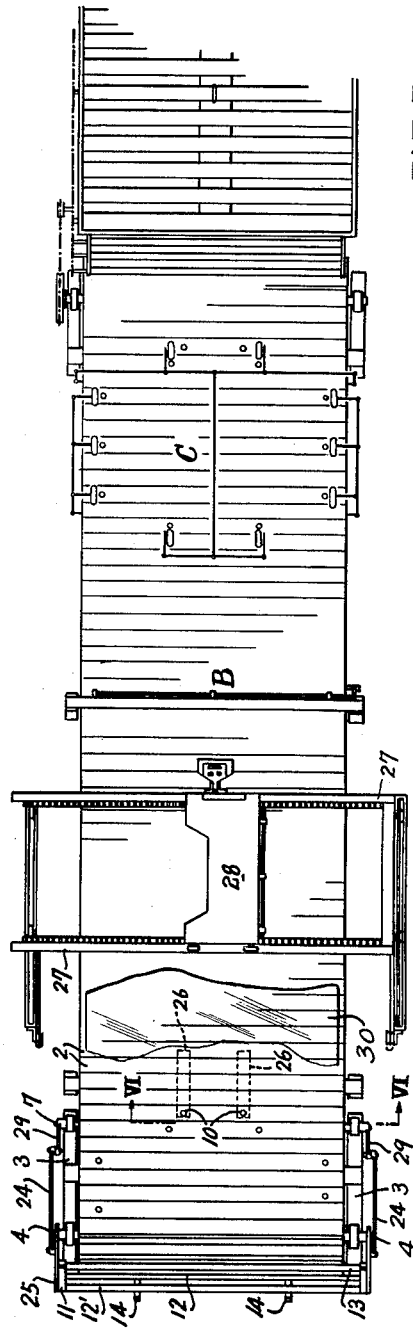
Fig. 2 is a plan view thereof.
Figure 3:
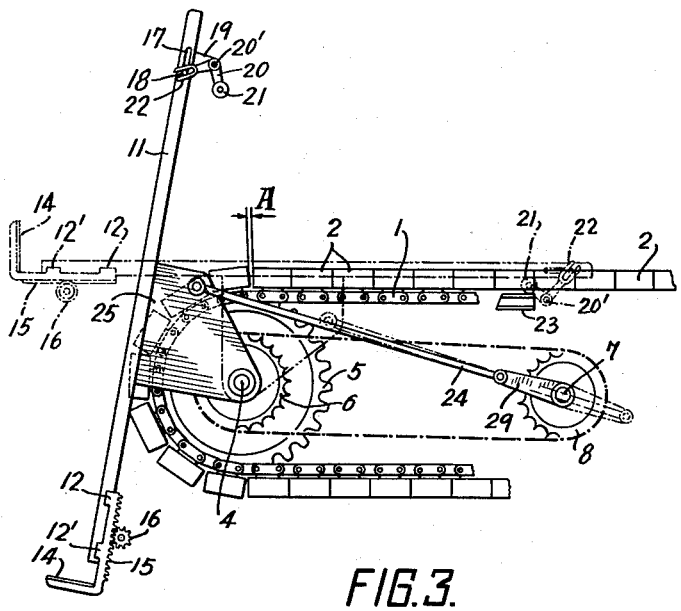
Fig. 3 is a partial enlarged side view illustrating how the automatic loading device for glasses to be cut is applied to the automatic glass cutting apparatus.

When the conveyor advances while being rotated by the sprocket wheels 5 and the wooden plate 2 passes successively from the circular movement at the end of the semi-circular circumference of the rear end portion of the conveyor to the straight line movement at the end of the semi-circular circumference of the rear end portion of the conveyor to the straight line movement as shown in Fig. 3, a clearance or gap A occurs in the circumferential portion of the conveyor travelling over the said sprocket wheels, due to the thickness of the conveyor between the front face of the last wooden plate 2 carrying out the circumferential movement and the back face of the last wooden plate carrying out the straight movement. In order to close the clearance A, the peripheral speed of rotation on this circumferential portion is increased instantaneously. According to the present invention, the glass sheet just transferred to the conveyor is thrust by the action of the portion of the conveyor moving with the higher peripheral speed up to the projected front stop pins; at the same time the front end of the sheet glass is always held by those stop pins 9 at a definite position.

Figure 4:
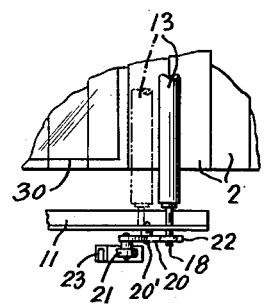
Fig. 4 is a partial plan view showing how the roll bar of the loading device of the invention moves.

The position of L-shaped glass supporting pieces 14 provided on the connecting bar 12 and bottom frame 12' at the lower part of the tilting frame may be controlled by suitably engaging the racks 15 with the pinion 16 according to the length of the glass sheet to be transferred. The glass sheet is loaded at the position shown with heavy lines in Figure 3. With the advancement of the conveyor, the chain wheel 8 is rotated by the belt chain passed around the chain wheels 6 mounted on the main shaft 4, and further with the rotation of said chain wheel 8, the tilting frame is turned forwards by the transmission movement of the crank 29 secured to the shaft 7 of said chain wheel 8, the connecting bar 24 as well as the fin-shaped plate 25 projected from the side frame of the tilting frame, and is made to fall forwards and reaches to the position as shown in Figure 3 with broken lines. And when the tilting frame is about to pass into this position the roller 21 at the one arm of the lever 20 pivoted to the arm piece 19 of the side bar strikes at the receiving rests 23 below the surface of the conveyor on both sides thereof to swing the bifurcated arm 22, the other arm of the lever 20 around the pivot 20'. Thus, the glass receiving roll bar 13 supporting the upper part of the glass sheet 30 is moved from the broken line position in Figure 4 to the thick line position by the swinging of the bifurcated arm 22 supporting the both journals 18. Then, the front end portion of the glass is detached from the roll bar and is transferred to the surface of the conveyor. Further, in this time, the rear end portion of the glass 30 is hung on the wooden plates of the higher speed peripheral portion of the conveyor, rapidly pushed forward in order to fill up the clearance A and at the same time the stop pins 9 are pushed upwards on the conveyor surface as described above, by the engagement of the stop pin lifting member 26 arranged under the small pin holes 10 at a definite position of wooden plates 2 of the conveyor with the bottom ends of the stop pins 10.

Colliding therewith, the front end of glass sheet is held at the definite loading position. (See the left hand side in Figure 5.) And for the lifting movement of those stop pins, any suitable mechanism may be used if needed instead of the aforesaid lifting mechanism.

Above described descriptions are referred to the case where the conveyor consists of thick wooden plates. The present invention is applicable similarly in case, when one or several belt conveyors are used and also in other cases.

Further, the foregoing descriptions have been made on one embodiment of the present invention in which glass sheet is loaded on the conveyor from the rear end of the conveyor. A transversal loading is, of course, also possible.

Thus, according to the present invention it is possible in a simple manner and by a simple apparatus to load the glass sheet always at such an accurate position as fitting to the glass cutting tools for cross cutting by fixing the loading position in forwarding the sheet glass up to the stop pin by means of the higher speed portion of the conveyor after said glass rested against loading frame has been transferred to the conveyor. Therefore, the cutting allowance for the useless edge portions of the front and rear portions of the glass sheet to be cut can be reduced to a minimum or almost null. Thus, in cutting glass sheet an extreme economical advantage can be obtained.

Obviously, the invention is not limited to the form of embodiment hereinbefore described and illustrated in the drawings for the elucidation thereof, but may be varied in its widest aspects within the scope of the basic idea thereof.

What I claim is:

1. A conveyor for feeding sheets of glass to be cut, comprising, an endless chain; sprocket wheels over which said chain travels, one of said wheels driving said chain; a series of horizontal supports fastened to said chain adapted to support a sheet of glass; a normally vertical framework pivotally mounted adjacent the conveyor on the axis of one of said sprocket wheels; an extensible member joined to said framework at one end and serving to retain sheets of glass against the framework; and a roller rotatably supported on said framework contiguous to a sheet of glass placed thereon and adapted to be actuated to move said sheet when the framework is pivoted into the plane of the conveyor.

2. A feeding member for use in conjunction with the conveyors of glass cutting equipment comprising: a normally vertical framework pivotally mounted adjacent the conveyor; an extensible member joined to said framework at one end and serving to retain sheets of glass against the framework; and rack means formed on said extensible member; pinion means on said framework engaging said rack means to extend said extensible member; a roller rotatably supported on said framework, normally out of the plane thereof and adapted to support a sheet of glass and lower same unto the conveyor when the framework is pivoted into the plane of the conveyor.

3. A method of automatically loading glass sheets at a definite position on an endless conveyor having a plurality of plates, said method comprising forming a clearance at a semi-circular glass loading end portion of the conveyor between the last plate carrying out a circumferential movement and the first plate carrying out a straight line movement, the extent of clearance depending on the thickness of the plates, and thrusting the glass sheets upon the conveyor at a higher speed than that of the conveyor by the action of said plates moving to fill said clearance.

References Cited in the file of this patent

UNITED STATES PATENTS

| | | |
|---|---|---|
| 905,043 | Anderson | Nov. 24, 1908 |
| 930,992 | Simons | Aug. 10, 1909 |
| 1,259,687 | Waterloo | Mar. 19, 1918 |
| 2,084,460 | Snow | June 22, 1937 |
| 2,092,539 | Talbot | Sept. 7, 1937 |
| 2,158,466 | Little | May 16, 1939 |
| 2,158,900 | Goffaux | May 16, 1939 |
| 2,259,765 | Morris | Oct. 21, 1941 |
| 2,601,929 | Brichard | July 1, 1952 |